United States Patent
Bartley et al.

(10) Patent No.: US 9,569,644 B2
(45) Date of Patent: *Feb. 14, 2017

(54) VERIFYING MOTION DATA FOR ACCESSING HARDWARE ELEMENTS

(71) Applicant: International Business Machines Corporation, Armonk, NY (US)

(72) Inventors: Gerald K. Bartley, Rochester, MN (US); Darryl J. Becker, Rochester, MN (US); Matthew S. Doyle, Chatfield, MN (US); Mark O. Maxson, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/086,488

(22) Filed: Mar. 31, 2016

(65) Prior Publication Data

US 2016/0357995 A1 Dec. 8, 2016

Related U.S. Application Data

(63) Continuation of application No. 14/728,020, filed on Jun. 2, 2015.

(51) Int. Cl.
*G06F 1/26* (2006.01)
*G06F 21/88* (2013.01)
*G06F 21/62* (2013.01)

(52) U.S. Cl.
CPC ........... *G06F 21/88* (2013.01); *G06F 21/6218* (2013.01)

(58) Field of Classification Search
CPC ...... G06F 21/88; G06F 21/6218; G06F 21/50; G06F 21/70; G06F 21/00; G06F 21/30; G06F 2221/2149; G06F 21/46
See application file for complete search history.

(56) References Cited

U.S. PATENT DOCUMENTS 8,232,879 B2 7/2012 Davis
8,427,320 B2 4/2013 Davis
(Continued)

FOREIGN PATENT DOCUMENTS

EP 2214118 A1 8/2010
EP 2400426 A1 12/2011

OTHER PUBLICATIONS

Terrell Bennett et al. "MotionSynthesis Toolset (MoST): A Toolset for Human Motion Data Synthesis and Validation," MobileHealth'14, Aug. 11-14, 2014, pp. 25-30.*

(Continued)

*Primary Examiner* — Luu Pham
*Assistant Examiner* — Canh Le
(74) *Attorney, Agent, or Firm* — Robert J. Shatto; Robert Williams

(57) ABSTRACT

Aspects of the present disclosure are directed towards a method of electronic verification of motion data. This includes collecting a first set of motion data that corresponds to a first set of motion characteristics generated from physically moving a hardware element of a computer ending upon inserting the hardware element of the computer into a computer chassis. This can further include determining an approved set of motion data and comparing the first set of motion data to the approved set of motion data. This can further include determining a difference between the first set of motion data and the approved set of motion data. This can further include determining that the difference does not satisfy a threshold. This can further include executing a (Continued)

reaction sequence in the computer, in response to determining that the difference does not satisfy the threshold.

1 Claim, 4 Drawing Sheets

(56) References Cited

U.S. PATENT DOCUMENTS

| | | |
|---|---|---|
| 2005/0049729 A1 | 3/2005 | Culbert et al. |
| 2006/0218113 A1* | 9/2006 | Kishi ............... G06F 17/30067 |
| 2010/0031331 A1* | 2/2010 | Ichinose ............. H04L 9/3226 726/6 |
| 2011/0302397 A1 | 12/2011 | Mitola, III |
| 2012/0260220 A1 | 10/2012 | Griffin |
| 2013/0212674 A1 | 8/2013 | Boger et al. |
| 2013/0263235 A1 | 10/2013 | Daigle |
| 2013/0333020 A1 | 12/2013 | Deshpande |
| 2014/0283128 A1 | 9/2014 | Shepherd et al. |
| 2015/0101017 A1 | 4/2015 | Abuelsaad et al. |
| 2015/0261944 A1* | 9/2015 | Hosom ................ G06F 21/32 726/19 |

OTHER PUBLICATIONS

Rodolfo Pellizzoni et al. "Handling Mixed-Criticality in SoC-based Real-time Embedded Systems," EMSOFT'09, Oct. 12-16, 2009, pp. 235-244.*

Bacheldor, B., "HID Global Seeks to Improve RFID Security Via Hand Gestures", RFID Journal, Copyright 2002-2015 RFID Journal LLC, 3 pages. Last Accessed Mar. 11, 2015 3:24 PM. http://www.rfidjournal.com/articles/view?10895/.

Bo et al., "SilentSense: Silent User Identification via Dynamics of Touch and Movement Behavioral Biometrics", arXiv:1309.0073v1 [cs.CR], Aug. 2013, pp. 1-9.

Gupta et al., "Password Authentication through lip reading using human machine interface", UACEE International Journal of Advances in Computer Networks and its Security—IJCNS, Publication Date: Jun. 5, 2013, pp: 58-62, vol. 3, Issue 2, [ISSN 2250-3757].

Bartley et al., "Verifying Motion Data for Accessing Hardware Elements," U.S. Appl. No. 14/728,020, filed Jun. 2, 2015.

List of IBM Patents or Patent Applications Treated as Related, Sep. 2, 2016, 2 pgs.

* cited by examiner

VERIFYING MOTION DATA FOR ACCESSING HARDWARE ELEMENTS

BACKGROUND

Aspects of the present disclosure relate to information security, more particular aspects relate to implementing an electronic verification of motion data with a series of physical motions of one or more hardware elements.

In applications where sensitive algorithms, data, or other program elements are stored, developed, and housed within non-volatile memory elements, there can be a concern that these sensitive elements could be accessed and thus have their security compromised. In order to improve data security, mechanisms can be used to detect intrusion attempts, prohibit unauthorized power-on of hardware, or to otherwise make it difficult to access data without authorization.

SUMMARY

Aspects of the present disclosure are directed towards a method of electronic verification of motion data. In embodiments, the method can include collecting a first set of motion data that corresponds to a first set of motion characteristics generated from physically moving a hardware element of a computer. In embodiments, collecting the first set of motion data can end upon inserting the hardware element of the computer into a computer chassis. In embodiments, the method can include determining an approved set of motion data. In embodiments, the approved set of motion data corresponds to an approved set of motion characteristics. In embodiments, the method can include comparing the first set of motion data to the approved set of motion data. In embodiments, the method can include determining a difference between the first set of motion data and the approved set of motion data. In embodiments, the method can include determining that the difference does not satisfy a threshold. In embodiments, the method can include executing a reaction sequence in the computer, in response to determining that the difference does not satisfy the threshold.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
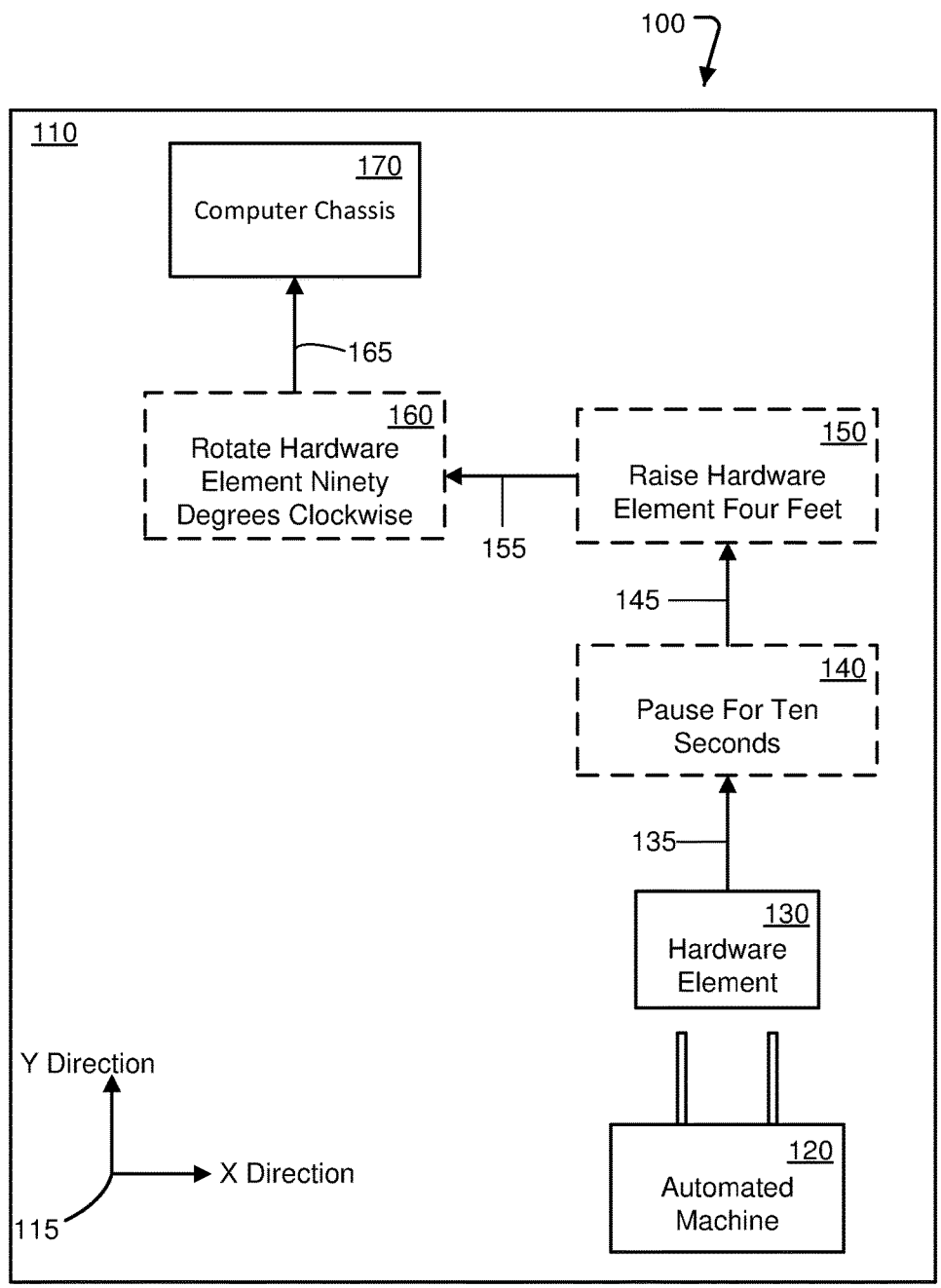
FIG. 1 illustrates a diagram of an automated machine physically manipulating a hardware element in a series of physical motions, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to information security, more particular aspects relate to implementing an electronic verification of motion data with a series of physical motions of one or more hardware elements for accessing one or more hardware elements of a computer system. While the present disclosure is not necessarily limited to such applications, various aspects of the disclosure may be appreciated through a discussion of various examples using this context.

To assist in data security, hardware elements containing sensitive data can be housed in a secure location or facility. In embodiments, the hardware elements can be physical components of a computer system, such as a computer processor, monitor, computer data storage, hard drive, server, or other computer system. In some embodiments, the hardware elements can be located separately from the computer system. In embodiments, the hardware elements can be communicatively connected to the computer system. In some instances the hardware elements could be moved out of a secure location, such as while being transported, or receiving maintenance, which could leave sensitive data vulnerable to unauthorized access. For example, the hardware element could be a hard drive located separately at a different geographic location from the server. Aspects of the present disclosure can increase the likelihood that the hardware elements are safely transported to the computer system and used by authorized users. Aspects of the present disclosure are directed towards implementing, in computer systems, an electronic verification of motion data with a series of physical motions in order to gain access to the data stored in one or more hardware elements of a computer system.

In secured environments, multiple hardware elements can be grouped together within a rack-style system packaging solution. To enhance a level of security, in embodiments, the hardware elements can be configured to recognize an approved series of physical motions and an approved insertion sequence before being inserted within the rack-style packaging system solution. If, during an initial or subsequent power-on procedure, one or more of the hardware elements do not recognize the insertion sequence, the hardware elements could execute a reaction sequence, as discussed further herein.

An electronic verification of motion data can be implemented in the hardware elements in order to increase the likelihood that the hardware element is being powered on by an authorized user. The electronic verification of motion data can be in the form of comparing a first set of motion data to an approved set of motion data. In embodiments, the approved set of motion data can be a numerical representation of an approved set of physical motions in the form of data. The approved set of physical motions can be an expected series of physical motions that the hardware element can undergo by an authorized user.

Turning now to FIG. 1, a top down view 100 looking down on an automated machine 120 physically manipulating a hardware element 130 in a series of physical motions, can be seen, according to various embodiments. In embodiments, the automated machine 120 can be an unmanned robotic machine. In some embodiments, the automated machine 120 can be a human operated machine, such as a forklift, pallet jack, dolly, hand truck, or other machine that is capable of physically manipulating the hardware element of the computer. In embodiments, the top down view 100, depicts the automated machine 120 manipulating the hardware element in a series of physical motions until the hardware element is inserted into a computer chassis 170 as the final movement in the series of motions.

The series of physical motions can include one or more motion characteristics. In embodiments, the one or more motion characteristics can be rotational and translational movement of the hardware element. The series of physical motions can conclude with the hardware element being inserted into a computer chassis. The approved set of physical motions can include translational motions and rotational motions. In embodiments, the translational movement can be the motion by which the hardware element can shift from one point in space to another. For example, the translational movement can be a plane, for example, the plane defined by the x and y axis. The translational movement can be in a horizontal direction, and the translational movement can be in a vertical direction. In embodiments, rotational motions can be a movement of the hardware element around a center (or point) of rotation of the center of mass of the hardware element. For example, spinning the hardware element in order to insert the hardware element into its final position in the chassis can be included as a rotational movement. The motion characteristics could include the acceleration, angular acceleration, velocity, position, and spatial orientation (e.g. tilt, angle from the surface of a floor).

In embodiments, the top down view 100, depicts a room 110 including a computer chassis 170. In certain embodiments, the computer chassis 170 can be a computer hardware rack, server housing, or other computer storage system. In some embodiments, the computer chassis 170 can be a server housing multiple elements of the computer system. In embodiments, the computer chassis 170 can include multiple slots or modules. In embodiments, the multiple slots or modules can contain similar content grouping together multiple hardware elements 130 of a computer, e.g. hard drives within a rack style system packaging solution. In embodiments, the computer system can infer the position and spatial orientation of the hardware element 130 within a slot of the computer chassis 170 from the motion data. For example, the computer system can determine the distance between one slot and an adjacent slot in the computer chassis 170 by analyzing and comparing the motion data.

In embodiments, one or more sensors can record the translational and rotational movement of the hardware element 130 in the form of a first set of motion data. In embodiments, the motion data could be various types of data extracted from the one or more motion sensors. In embodiments, the motion sensors could be micro-electronic mechanical systems (MEMS) that are capable of measuring the movement of the hardware element. The movement sensors could include an accelerometer measuring the acceleration. The movement sensors could include an inclinometer measuring the tilt. The movement sensors could include a compass measuring direction. The movement sensors could include a gyroscope measuring the angular acceleration. Inferring more information than the acceleration, tilt, and direction of the hardware element 130 can be accomplished from the results obtained from the motion sensors. For example, by deriving data from the accelerometer and deriving data from the gyroscope, the velocity and the position of the hardware element, as well as, the angular velocity of the hardware element could be determined, respectively. In some embodiments, in order to secure such isolated hardware elements, the motion sensors can be communicatively coupled to the hardware elements, and can also be physically attached to the hardware elements. In embodiments, the motion sensors and the hardware element can be powered by auxiliary power, a battery, or other short-term power supply.

An axis of direction 115 is shown in the lower left corner of FIG. 1. The series of physical motions can include as shown in FIG. 1, the automated machine 120 accelerating followed by decelerating in the positive Y direction for 10 meters on path 135 towards the computer chassis until reaching a location 140. In embodiments, the acceleration can be detected by the accelerometer. The orientation of the hardware element during the series of motions can be detected by the gyroscope and the direction of translational movement can be detected by a compass. The series of physical motions can include pausing for ten seconds at location 140. The series of physical motions can include, after pausing for ten seconds at location 140, accelerating followed by decelerating in the positive Y direction for 10 meters on path 145 until reaching a location 150. In embodiments, at location 150, the automated machine 120 can then continue by raising the hardware element 130 four feet vertically away from the floor of the room. In embodiments, the accelerometer can detect the acceleration of the hardware element in the vertical direction when the automated machine 120 is raising the hardware element 130. The series of physical motions can include, at location 150, rotating the hardware element from the positive Y direction to the negative X direction, then accelerating in the negative X direction for 15 meters on path 155 until aligning the hardware element 130 with the computer chassis 170 at a location 160. The series of physical motions can include, at location 160, rotating the hardware element 130 ninety degrees clockwise. In embodiments, the series of physical motions can include, at location 160, rotating the hardware element 130 from the negative X direction to the positive Y direction, and continuing in the positive Y direction towards the computer chassis 170 at a velocity for 20 meters on path 165 until the forklift can insert the hardware element 130 into the computer chassis 170. In embodiments, inserting the hardware element 130 into the computer chassis 170 can be the final motion in the series of physical motions.

In embodiments, the inclinometer in conjunction with the compass can detect the spatial orientation of the final position of the hardware element 130 in the computer chassis 170. The inclinometer and compass can detect if the forklift has properly inserted the hardware element 130 into the computer chassis 170, and the location of the hardware element 130 within the computer chassis 170. Proper insertion of the hardware element 130 into the computer chassis 170 can include the inclinometer measuring the tilt of the bottom surface of the hardware element 130 with respect to a surface of a slot within the computer chassis 170. Proper insertion of the hardware element 130 into the computer chassis 170 can also include the compass measuring the final direction of the hardware element 130 with respect to a direction so that one or more surfaces of the hardware element 130 are parallel to the inside of the computer chassis 170 slot.

In embodiments, the automated machine 120 can have a programmed set of instructions that can include an approved series of physical motions. The series of physical motions can include an approved set of motion data. The approved set of motion data can be substantially similar to the first set of motion data. The approved set of motion data can be used as a comparison to increase the likelihood that if the first set of motion data is within a threshold of the approved set of motion data, then the hardware element 130 is being used by an authorized user. The approved set of motion data can correspond to information included in an approved set of motion characteristics. The approved set of motion characteristics can be a set of motion characteristics that are intended for the hardware element 130 to undergo by authorized users. The authorized users can be an automated machine, such as the automated machine 120 described in FIG. 1. In embodiments, the approved set of motion data may be a numerical representation of the approved motion characteristics in the form of data. For example, if the hardware element is being used in an operating environment that includes being physically manipulated by an automated machine in a certain series of physical motions before being inserted into a computer chassis, then the approved set of motion data could include the certain series of physical motions that could be collected by the various movement sensors. In embodiments, the approved set of motion data can include an approved acceleration, an approved final position, an approved time, and an approved orientation of the hardware element 130 that can be compared with the first set of motion data, as discussed herein.

Figure 2:
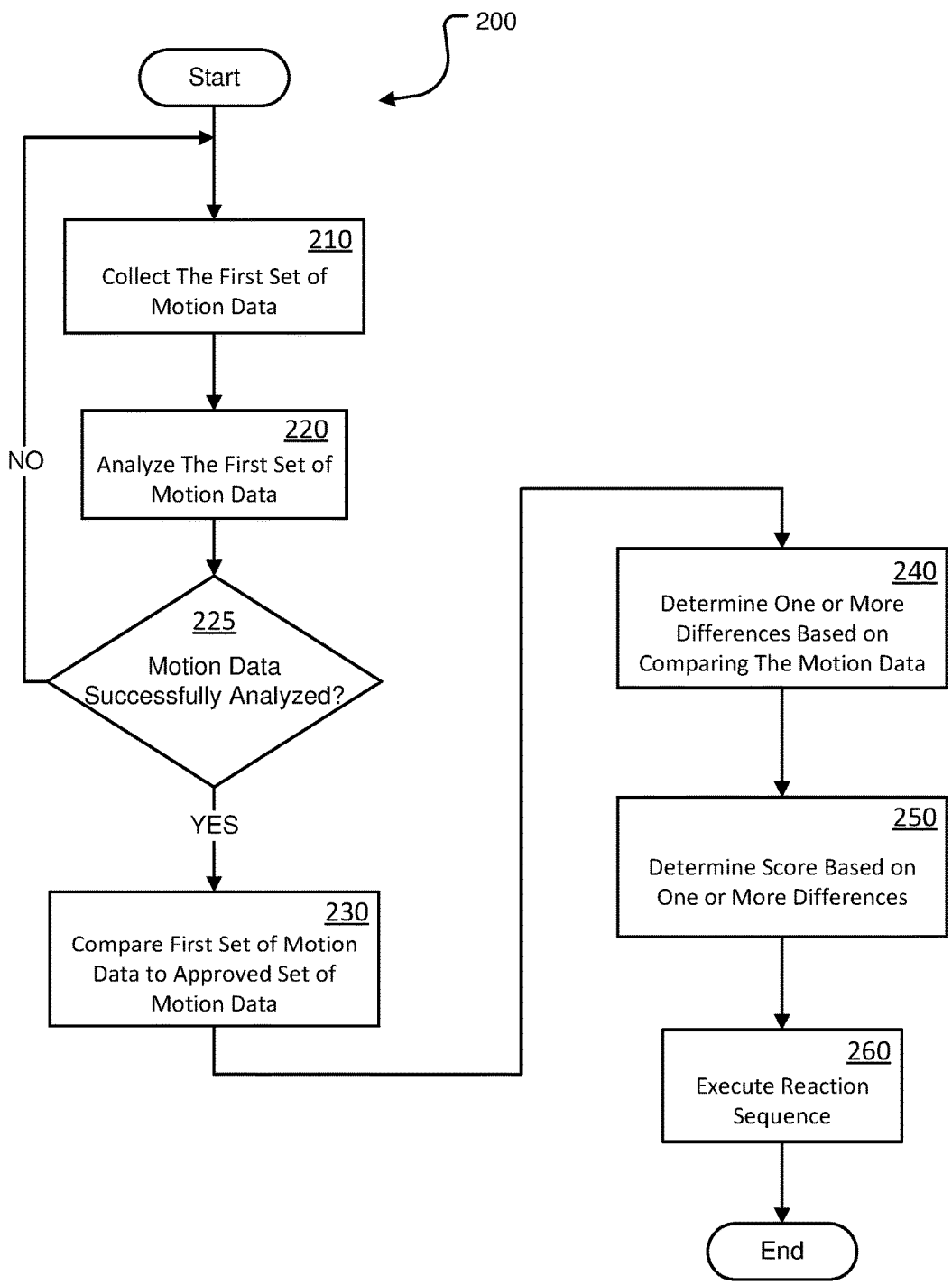
FIG. 2 illustrates a flow chart for a method of collecting and analyzing motion data, according to various embodiments.

Turning now to FIG. 2, a flow chart for a method 200 of processing motion data can be seen, according to various embodiments. In embodiments, the method can include, in operation 210, collecting a first set of motion data from one or more sensors. Collecting the first set of motion data can occur in response to a condition occurring. In embodiments, the condition may be various circumstances that influence the actions of a computer. For example, the condition could be a command to power-on a portion of the computer, to access data from the computer, to execute an application, or other type of computer-based command. In some embodiments, the condition can be a command for the computer to perform a set of operations, such as collect the first set of motion data. In embodiments, the computer could be a programmable machine that is capable of executing a set of operations, such as processing and comparing motion data.

In embodiments, first set of motion data can be an electronic representation of a first set of motion characteristics of the hardware element in the form of numerical data. The first set of motion characteristics can correspond to a machine or human physically manipulating one or more hardware elements of the computer, such as a storage system, in a series of physical motions. For example, the first set of motion characteristics can include physically manipulating the hardware elements before inserting the hardware elements into a computer chassis 170 as in FIG. 1. In embodiments, the first set of motion data can include acceleration data, orientation data, final position data, and time data. In embodiments, the collecting the first set of motion data can conclude upon insertion of the hardware element into the computer chassis. In some embodiments, collecting can conclude upon the hardware element being physically connected to the computer system. In certain embodiments, collecting can conclude upon expiration of a time based interval. For example, collecting can occur for thirty seconds. In some embodiments, collecting can occur within a certain time. For example, the hardware element can be inserted into the computer chassis within thirty seconds. In embodiments, after collecting the first set of motion data, the method 200 can proceed to an operation 220.

In embodiments, the operation 220 can include the computer system analyzing the first set of motion data. In embodiments, analyzing can include the computer system extracting the motion data from the one or more motion sensors and examining the constitution or structure of the motion data and determining meaningful results, such as the acceleration, tilt, and the orientation of the hardware element 130. For example, determining meaningful results can include organizing the motion data into numerical values describing the motion characteristics. This can include organizing the motion data further into categories including position, velocity, angular velocity, and angular acceleration of the hardware element 130 of the computer.

In embodiments, analyzing can include calculating a first acceleration of the hardware element. In embodiments, the first acceleration is the acceleration of the hardware element while the hardware element is being physically manipulated. In embodiments, the first acceleration may be partitioned into single motions, for example, acceleration during each path in FIG. 1. The first acceleration can also be partitioned by direction, and partitioned by time. In embodiments, analyzing can include determining a first orientation of the hardware element while being physically manipulated. For example, the first orientation can be collected at set times during each path in FIG. 1. For example, the set times can start at a location and end at a following location in FIG. 1. The final position of the hardware element can be included in the first orientation. In some embodiments, analyzing can include determining a first time. The first time can be the total length of time that the hardware element is being physically manipulated. The total length of time can begin when the condition occurs and conclude when the hardware element is inserted into the computer chassis and the one or more sensors have finished collecting data. The first time can include the time that the hardware element is not being physically manipulated.

In embodiments, operation 220 also can include implementing additional techniques to further analyze the motion data, in the case if the motion data is unreadable. For example, in the case where either the stored approved set of motion data is unreadable, or the ability to successfully collect or interpret the first set of motion data is unsuccessful. Recollecting the motion data can occur if the computer is not capable of processing or interpreting the motion data. In embodiments, operation 210 may proceed to a decision block 225 after collecting and analyzing the data.

In certain embodiments, the method 200 can include, in decision block 225, determining if the motion data has been successfully analyzed. The motion sensors can recollect the motion data if the motion data cannot be successfully analyzed. In embodiments, successfully analyzed means that the techniques can determine the first acceleration, first orientation, and first time. In embodiments, if the motion data is successfully analyzed, the method 200 can proceed to an operation 230; otherwise, the method 200 could return to operation 210.

In embodiments, the computer system can compare the first set of motion data to an approved set of motion data, then respond in various ways if the first set of motion data does not satisfy a threshold, the threshold discussed further herein. In some embodiments, the hardware element can collect a first set of motion data and once inserted into the computer chassis and connected to the computer system, a second condition can occur. The second condition can trigger the computer system to compare the first set of motion data to the approved set of motion data.

In certain embodiments, the approved set of motion data can be stored in memory in the computer. The memory may be operatively coupled to the computer. The memory that can store the approved set of motion data may not be accessible after the condition occurs. For example, once the computer is turned on, the approved set of motion data cannot be accessible. The memory may not be accessible after time zero, so unauthorized users attempting to extract the approved set of motion data may fail in retrieving information from the computer or hardware elements.

In embodiments, operation 230 can include comparing the first set of motion data to the approved set of motion data. Comparing the first set of motion data to the approved set of motion data can include comparing the first acceleration to the approved acceleration. Comparing the first set of motion data to the approved set of motion data can include comparing the first orientation to the approved orientation. Comparing the first set of motion data to the approved set of motion data can include comparing the first time to an approved time. The present disclosure does not limit comparing the available types of motion characteristics to acceleration, orientation, and time. Motion characteristics can also include altitude of the hardware element, velocity of the hardware element, angular velocity of the hardware element, and angular acceleration of the hardware element. In embodiments, after comparing the first set of motion data to the approved set of motion data, operation 230 can proceed to an operation 240.

The method can include, in operation 240, determining a difference between the first set of motion data and the approved set of motion data. In embodiments, the difference can be a representation of the quantitative contrast between the first set of motion characteristics and the approved set of motion characteristics. For example, the difference with respect to the acceleration can be represented as a magnitude of the first acceleration subtracted from the approved acceleration, and can be called the acceleration difference. In embodiments, operation 230 can include determining a time difference and an orientation difference in a substantially similar way as determining the acceleration difference can be accomplished. In embodiments, after determining the one or more differences based on the motion characteristics, the operation 240 can proceed to an operation 250.

The method can include, in operation 250, determining a score (S) that is based on the one or more differences. The score can be an aggregate of the one or more difference, can be a single numerical value, and can be unit less. In embodiments, the score can be a numerical representation of the difference between the first set of motion data and the approved set of motion data. For example, the score can be an indication that an authorized user is physically manipulating the hardware element. In certain embodiments, scoring can include weighting the differences for each motion characteristic. In embodiments, weighting may be a numerical representation of the relative difficulty of reproducing a certain motion characteristic. For example, the approved acceleration may be more difficult to reproduce than the approved time or the approved orientation. For this reason, the acceleration difference can be weighted more heavily than the orientation difference and time difference.

The method can include determining that the score does not satisfy a threshold. In embodiments, the threshold may be a numerical representation indicating the limit of an acceptable difference between the first set of motion characteristics and the approved set of motion characteristics. In embodiments, achieving the threshold may be accomplished when the magnitude of the score is less than the magnitude of the threshold. In certain embodiments, not achieving the threshold may cause a reaction sequence to occur, the reaction sequence discussed herein. In embodiments, after the operation 250 determines the score, operation 250 can proceed to an operation 260.

The method can include, in operation 260, executing a reaction sequence in the computer. The reaction sequence can have more than one response that depends on the value of the score. The reaction sequence can have more than one threshold ranges that the score can satisfy. In some embodiments, the reaction sequence can be a set of events occurring in the computer in response to a threshold range not being satisfied. In embodiments, the reaction sequence can initiate one or more alarms. In embodiments, the reaction sequence can overwrite data stored in the computer, physically damage the computer, shut-down the computer, or initiate one or more alarms. Initiating the reaction sequence may be with the intention to restrict the user from accessing the computer or 'sensitive' information stored in the computer.

Removing the hardware element from the computer chassis can cause the computer system to erase the first set of motion data. The first set of motion data can be required for granting permission to an authorized user for accessing the hardware element. By erasing the first set of motion data from the hardware element, the motion sensors can collect a new first set of motion data in order to access the hardware element. This can increase the likelihood of securing the hardware element of the computer from unauthorized users attempting to access the hardware element after the hardware element is inserted in the computer chassis.

Figure 3:
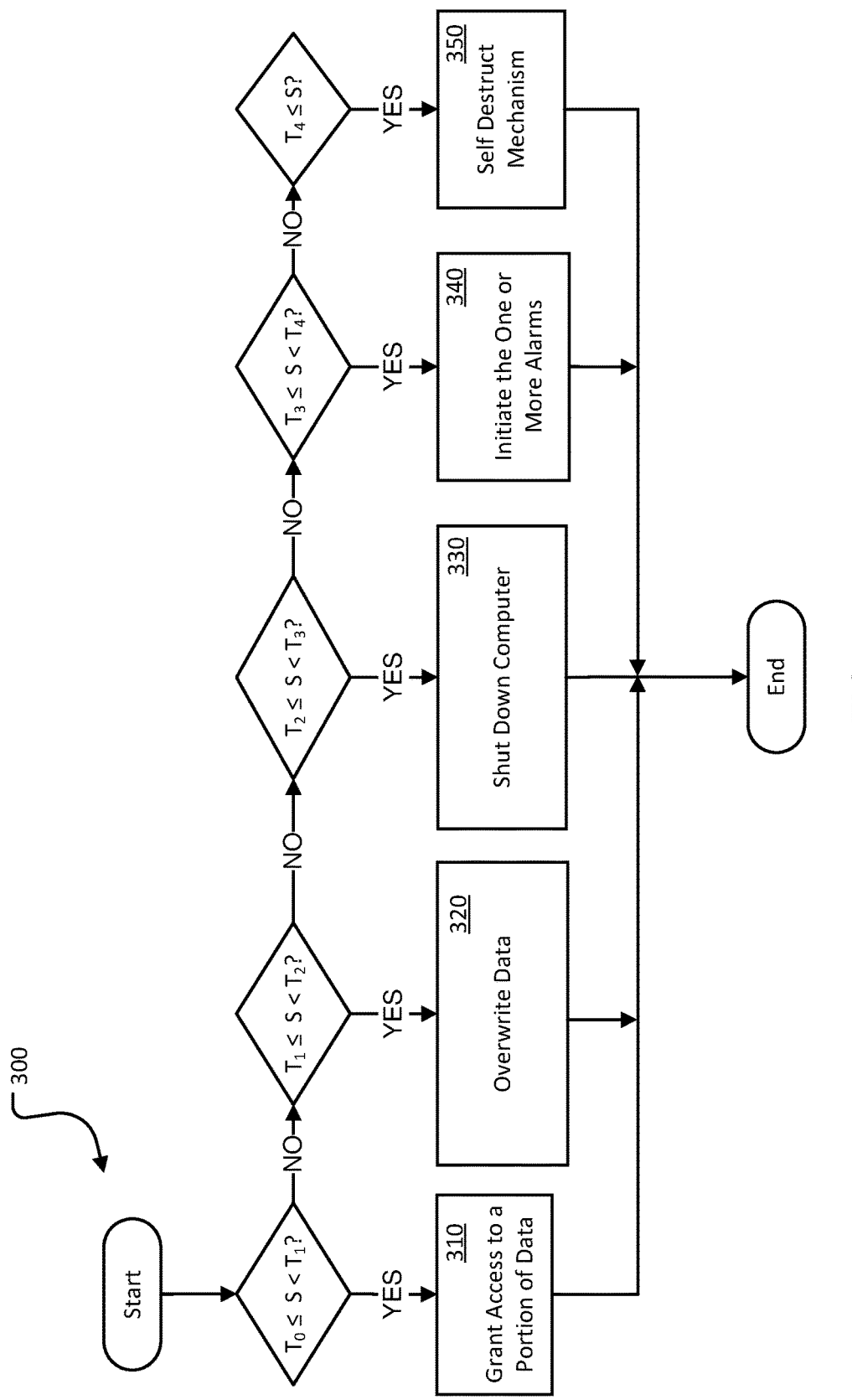
FIG. 3 illustrates a flow chart for a method for executing a reaction sequence, according to various embodiments.

Turning now to FIG. 3, a flow chart of a method 300 for a reaction sequence can be seen, according to various embodiments. The reaction sequence illustrated in FIG. 3 can be an embodiment of operation 260. In embodiments, executing a response in the reaction sequence depends on the value of the score. In embodiments, the method 300 can include, checking at each decision block if the score is within a threshold range of the current decision block. For example, in embodiments, each decision block can have its own threshold range. In embodiments, the threshold ranges can be predetermined numerical values in increments of one in increasing order labeled $T_0$, $T_1$, $T_2$, $T_3$, and $T_4$, e.g. $T_0<T_1<T_2<T_3<T_4$. In embodiments, the score may begin at the decision block with a threshold range of $T_0 \leq S \leq T_1$. If the score is not within the threshold range $T_0 \leq S < T_1$, the score can proceed to the decision block with the threshold range including $T_1 \leq S < T_2$, and continue until the score reaches a decision block with a threshold range that the score is within. In embodiments, employing the reaction sequence may occur in order to restrict unauthorized end users from attempting to access information stored in the computer.

In certain embodiments, the operation 310 can include granting the end user partial access to the computer. In embodiments, operation 310 occurs if the score has a value of $T_0 \leq S < T_1$. In embodiments, granting the end user access may not necessarily mean granting access to all information stored in the computer. Although access may be granted to the computer, the condition may reoccur in response to the expiration of a time-based interval. In embodiments, the time-based interval may cause the method 300 to reoccur.

In embodiments, granting access can occur from a radio frequency identification (RFID) device transmitting an electromagnetic signal to a receiver confirming that the score has a value of $T_0 \leq S < T_1$. The RFID device can be connectively coupled to the hardware element and can transmit the electromagnetic signal in response to the score being within one or more threshold ranges. The RFID device can generate a modified signal that depends on the threshold range that the score falls within. For example, the RFID device can generate an electromagnetic signal that is unique to each of the threshold ranges. The receiver can be communicatively coupled to the computer system. In certain embodiments, the RFID device and the receiver can be internally attached within the hardware element. In embodiments, the RFID device can be internally attached within the hardware element and the receiver can be physically attached to the chassis. In embodiments, the method 300 may proceed to an operation 320, if the score has a value of $T_1 \leq S$.

In some embodiments, the method 300 can include, in operation 320 overwriting a set of data stored in the computer. In embodiments, overwriting the set of data may be the process of writing a binary set of data stored in the memory, the memory that is operatively connected to the computer. In embodiments, overwriting may include writing over old data stored in the memory. For example, in embodiments, the set of data may be deleted by overwriting the set of data in binary with all zeroes followed by all ones multiple times so that the set of data can be unreadable.

In embodiments, overwriting the set of data may include rewriting the set of data. For example, in certain embodiments, overwriting the information could include formatting the set of data with random information or an explanation as to why executing the reaction sequence may have been necessary. In embodiments, the method 300 may proceed to an operation 330, if the score has a value of $T_2 \leq S$.

In embodiments, the method 300 can include, in operation 330, shutting down the computer. In some embodiments, shutting-down the computer may be done by restricting power to the computer. In some embodiments, shutting-down the computer may transpire for a varying amount of time. For example, in embodiments, shutting-down the computer may be temporary, permanently, or until determining a solution as to why executing the reaction sequence may have been necessary. In some embodiments, the method 300 may proceed to an operation 340, if the score has a value of $T_3 \leq S$.

In certain embodiments, the method 300 may include, in operation 340, initiating one or more alarms. In embodiments, the one or more alarms may include an electromagnetic alarm, an auditory alarm, or a smoke alarm. For example, in embodiments, the electromagnetic alarm may send out electromagnetic waves in the infrared spectrum or the ultraviolet spectrum and the auditory alarm can be a high-pitched frequency. In certain embodiments, the method 300 can proceed to an operation 350, if the score has a value of $T_4 \leq S$.

In embodiments, the method 300 can include, in operation 350, initiating a self-destruct mechanism. In some embodiments, initiating the self-destruct mechanism may be in the form of causing physical damage to hardware that restricts access to a portion of data. For example, causing damage may affect the electrical circuitry of the computer beyond repair.

In some embodiments, satisfying the threshold in order to gain access to the computer can depend on an order of inserting more than one hardware elements into the chassis. For example, more than one hardware element of the computer can have its own distinct series of physical motions. In some embodiments, the one or more hardware elements can also have the same series of physical motions. For example, if there are four hardware elements, two can be required to be physically manipulated in one series of physical motions and another two can be required to be physically manipulated in another series of physical motions. In certain embodiments, the order of each hardware element being inserted into the chassis can be required. For example, the threshold cannot be achieved if one hardware element is inserted before its approved turn, where the approved turn can be included in the approved set of motion data. In certain embodiments, the possible permutations for combining the order of inserting the hardware elements into the chassis and the individual hardware element's programmed series of physical motions can be determined and configured into the approved set of motion data.

Figure 4:
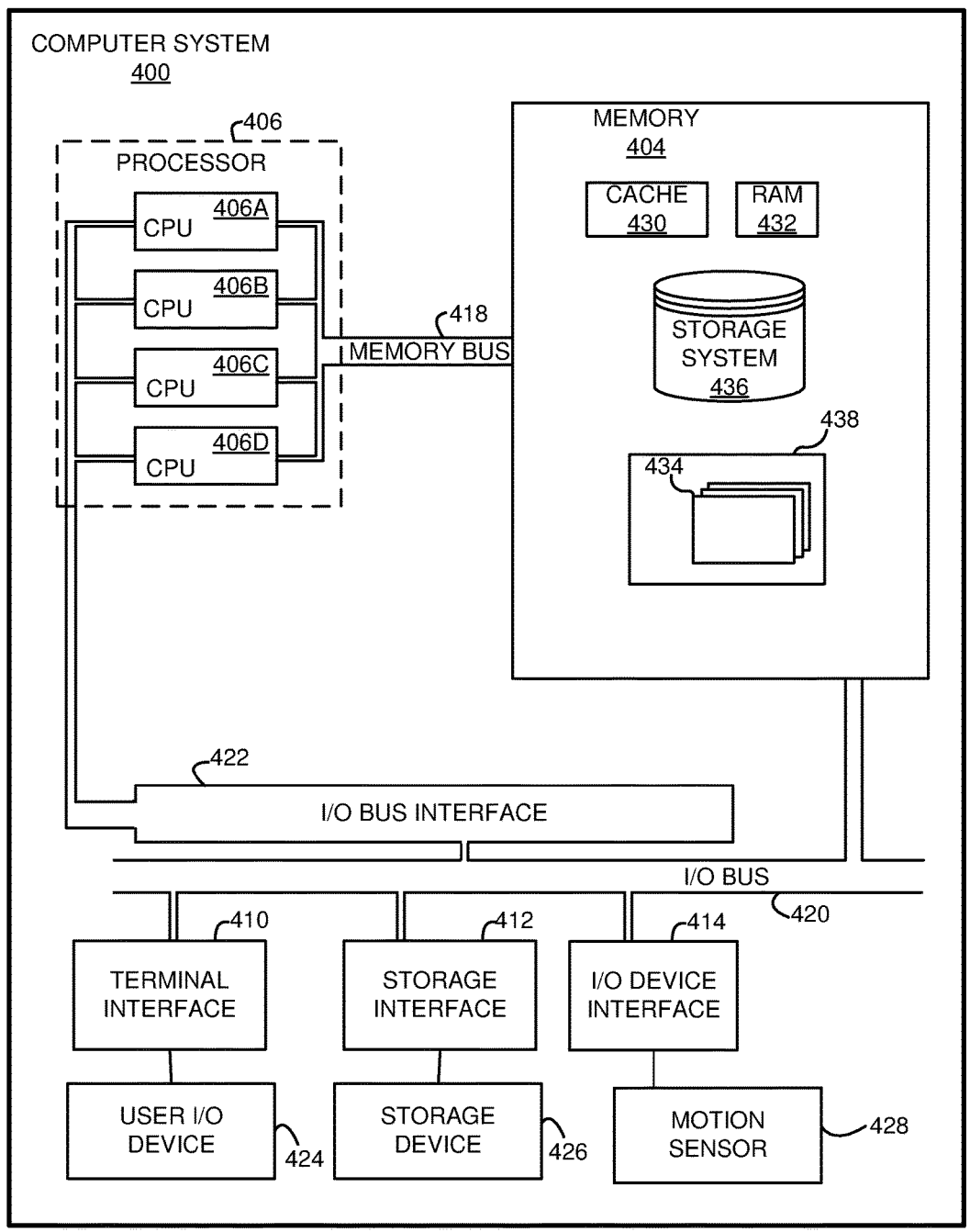
FIG. 4 illustrates a block diagram of a computer system that collects and analyzes data from motion sensors, according to various embodiments.

FIG. 4 depicts a high-level block diagram of a system for implementing embodiments of the disclosure. The mechanisms and apparatus of embodiments of the present disclosure apply equally to any appropriate computing system. The major components of the computer system 400 comprise one or more processors 406, a main memory 404, a terminal interface 410, a storage interface 412, an I/O (Input/Output) device interface 414, a user I/O device 424, and a storage device 426, all of which are communicatively coupled, directly or indirectly, for inter-component communication via a memory bus 418, an I/O bus 420, and an I/O bus interface unit 422.

The computer system 400 may contain one or more general-purpose programmable central processing units (CPUs) 406A, 406B, 406C, and 406D, herein generically referred to as the processor 406. In an embodiment, the computer system 400 contains multiple processors typical of a relatively large system; however, in another embodiment the computer system 400 may alternatively be a single CPU system. Each processor 406 executes instructions stored in the main memory 404 and may comprise one or more levels of on-board cache 430.

In an embodiment, the main memory 404 may comprise a random-access semiconductor memory, storage device, or storage medium (either volatile or non-volatile) for storing or encoding data and programs 434. In another embodiment, the main memory 404 represents the entire virtual memory of the computer system 400, and may also include the virtual memory of other computer systems coupled to the computer system 400 or connected via a network. The main memory 404 is conceptually a single monolithic entity, but in other embodiments the main memory 404 is a more complex arrangement, such as a hierarchy of caches 430 and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 404 may store all or a portion of the following: RAM 432, cache 430, storage system 436, one or more programs/utilities 434, and at least one set of program modules 438. Although the RAM 432, cache 430, storage system 436, one or more programs/utilities 434, and at least one set of program modules 438 are illustrated as being contained within the memory 404 in the computer system 400, in other embodiments some or all of them may be on different computer systems and may be accessed remotely, e.g., via a network. The computer system 400 may use virtual addressing mechanisms that allow the programs of the computer system 400 to behave as if they only have access to a large, single storage entity instead of access to multiple, smaller storage entities. Thus, while the RAM 432, cache 430, storage system 436, one or more programs/ utilities 438, and at least one set of program modules 438 are illustrated as being contained within the main memory 404, these components are not necessarily all completely contained in the same storage device at the same time. Further, although the RAM 432, cache 430, storage system 436, one or more programs/utilities 438, and at least one set of program modules 438 are illustrated as being separate entities, in other embodiments some of them, portions of some of them, or all of them may be packaged together.

In an embodiment, the memory 404 comprise instructions or statements that execute on the processor 406 or instructions or statements that are interpreted by instructions or statements that execute on the processor 406, to carry out the functions as further described with reference to the figures as discussed herein. For example, the memory 404 can store the approved set of motion data and can be compared to the first set of data by the processor 406. The memory 404 can store instructions for extracting information from one or more motion sensors 428, determining the one or more differences, score, as well as, for executing the reaction sequence. The memory 404 can store the information from one or more motion sensors 428 once the motion sensors 428 have been connected to the I/O device interface 414 of the computer system 400. The computer system 400 can be communicatively and connectively coupled to the hardware element. The terminal interface 410 can update the user with a real time analysis of the one or more actions being implemented in method 200.

In another embodiment, the main memory 404 are implemented in hardware via semiconductor devices, chips, logical gates, circuits, circuit cards, and/or other physical hardware devices in lieu of, or in addition to, a processor-based system. In an embodiment, the main memory 404 comprise data in addition to instructions or statements.

The memory bus 418 provides a data communication path for transferring data among the processor 406, the main memory 404, and the I/O bus interface 422. The I/O bus interface 422 is further coupled to the I/O bus 420 for transferring data to and from the various I/O units. The I/O bus interface unit 422 communicates with multiple I/O interface units 410, 412, 414, 424, and 426 which are also known as I/O processors (IOPs) or I/O adapters (IOAs), through the I/O bus 420.

The I/O interface units support communication with a variety of storage and I/O devices. For example, the terminal interface unit 410 supports the attachment of one or more user I/O devices 424, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 424 and the computer system 400, and may receive output data via the user output devices. For example, a user interface may be presented via the user I/O device 424, such as displayed on a display device, played via a speaker, or printed via a printer.

The storage interface 412 supports the attachment of one or more disk drives or direct access storage devices 426 (which are typically rotating magnetic disk drive storage devices, although they could alternatively be other storage devices, including arrays of disk drives configured to appear as a single large storage device to a host computer). In another embodiment, the storage device 426 may be implemented via any type of secondary storage device. The contents of the main memory 404, or any portion thereof, may be stored to and retrieved from the storage device 426, as needed. The I/O device interface 414 provides an interface to any of various other input/output devices or devices of other types, such as printers or fax machines. The network interface provides one or more communications paths from the computer system 400 to other digital devices and computer systems; such paths may comprise, e.g., one or more networks.

Although the memory bus 418 is shown in FIG. 4 as a relatively simple, single bus structure providing a direct communication path among the processors 406, the main memory 404, and the I/O bus interface 422, in fact the memory bus 418 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 422 and the I/O bus 420 are shown as single respective units, the computer system 400 may, in fact, contain multiple I/O bus interface units 422 and/or multiple I/O buses 420. While multiple I/O interface units are shown, which separate the I/O bus 420 from various communications paths running to the various I/O devices, in other embodiments some or all of the I/O devices are connected directly to one or more system I/O buses.

In various embodiments, the computer system 400 is a multi-user mainframe computer system, a single-user system, or a server computer or similar device that has little or no direct user interface, but receives requests from other computer systems (clients). In other embodiments, the computer system 400 is implemented as a desktop computer, portable computer, laptop or notebook computer, tablet computer, pocket computer, telephone, smart phone, or any other appropriate type of electronic device.

FIG. 4 is intended to depict the representative major components of the computer system 400. But, individual components may have greater complexity than represented in FIG. 4, components other than or in addition to those shown in FIG. 4 may be present, and the number, type, and configuration of such components may vary. Several particular examples of such additional complexity or additional variations are disclosed herein; these are by way of example only and are not necessarily the only such variations. The various program components illustrated in FIG. 4 and implementing various embodiments of the invention may be implemented in a number of manners, including using various computer applications, routines, components, programs, objects, modules, data structures, etc., and are referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of electronic verification of motion data, the method comprising:
 collecting, in response to receiving a computer-based command to power on a computer that includes a hardware element having a processor, memory, gyroscope, and accelerometer, the hardware element being configured to be inserted into a slot of a computer hardware rack having one or more slots, a first set of motion data that corresponds to a first set of motion characteristics generated from physically rotating and translating the hardware element of the computer, the first set of motion data further including a distance between a slot in the computer hardware rack where the hardware element of the computer is inserted and an adjacent slot in the computer hardware rack;

terminating the collection of the first set of motion data when the hardware element of the computer is inserted within a slot of the computer hardware rack;

analyzing the first set of motion data, wherein analyzing the first set of motion data includes generating numerical values for the first set of motion characteristics;

determining whether or not the first set of motion data was successfully analyzed;

repeating the step of collecting, in response to the first set of motion data not being successfully analyzed, the first set of motion data;

determining an approved set of motion data, the approved set of motion data corresponding to an approved set of motion characteristics;

comparing, in response to the first set of motion data being successfully analyzed and after inserting the hardware element into the slot in the computer hardware rack, the first set of motion data to the approved set of motion data;

determining, based on the comparing, a difference between the first set of motion data and the approved set of motion data;

determining a score for the difference between the first set of motion data and the approved set of motion data, where the score is a numerical representation of the difference between the first set of motion data and the approved set of motion data;

determining that the score for the difference between the first set of motion data and the approved set of motion data does not satisfy a threshold range; and executing a reaction sequence in the computer in response to determining that the score does not satisfy the threshold range, wherein the reaction sequence includes overwriting a set of data stored in the computer.

* * * * *